US007045476B1

(12) United States Patent
Lally

(10) Patent No.: US 7,045,476 B1
(45) Date of Patent: *May 16, 2006

(54) AERATED REFRACTORY, METHOD FOR PRODUCING HIGH-TEMPERATURE STRUCTURAL MEMBERS

(76) Inventor: Thomas Joseph Lally, 603 Mallard La., Oak Brook, IL (US) 60523

( * ) Notice: Subject to any disclaimer, the term of this patent is extended or adjusted under 35 U.S.C. 154(b) by 0 days.

This patent is subject to a terminal disclaimer.

(21) Appl. No.: 10/964,880

(22) Filed: Oct. 14, 2004

Related U.S. Application Data

(60) Continuation-in-part of application No. 10/685,214, filed on Oct. 14, 2003, now abandoned, which is a continuation-in-part of application No. 10/338,425, filed on Jan. 8, 2003, now Pat. No. 6,787,495, which is a division of application No. 09/602,067, filed on Jun. 22, 2000, now Pat. No. 6,533,821.

(60) Provisional application No. 60/510,898, filed on Oct. 14, 2003.

(51) Int. Cl.
  *C04B 35/03*   (2006.01)
  *C04B 35/04*   (2006.01)
  *C04B 35/057*  (2006.01)
  *C09D 5/18*    (2006.01)

(52) U.S. Cl. .................... 501/111; 501/112; 106/18.11; 106/18.14; 106/18.26

(58) Field of Classification Search ................ 501/111, 501/122; 106/18.11, 18.14, 18.26, 35
See application file for complete search history.

(56) References Cited

U.S. PATENT DOCUMENTS

| | | | | |
|---|---|---|---|---|
| 4,824,811 A * | 4/1989 | Lang et al. | .................... | 501/84 |
| 5,149,368 A * | 9/1992 | Liu et al. | .................... | 424/602 |
| 5,298,068 A * | 3/1994 | Giesemann | .................. | 106/604 |
| 5,709,742 A * | 1/1998 | Fulmer et al. | .............. | 106/690 |
| 5,858,333 A * | 1/1999 | Winston et al. | ............... | 424/57 |
| 6,518,212 B1 * | 2/2003 | Wagh et al. | ................. | 501/111 |
| 6,533,821 B1 * | 3/2003 | Lally | ........................ | 623/23.62 |

* cited by examiner

Primary Examiner—Elizabeth D. Wood

(57) ABSTRACT

An aerated refractory is provided comprising a mixture containing a phosphate compound, a metal oxide, a calcium containing compound; and an agent for increasing the volume of the mixture. Also provided is a method for protecting a substrate with aerated refractory, the method comprising dry mixing mono-potassium phosphate with a metal oxide and a calcium containing compound (i.e. hydroxyapatite) to produce a homogenous dry mixture; adding water to the mixture to produce a slurry; adding a foaming agent to the slurry; applying the slurry to the substrate; and allowing the slurry to dry.

17 Claims, No Drawings

AERATED REFRACTORY, METHOD FOR PRODUCING HIGH-TEMPERATURE STRUCTURAL MEMBERS

RELATION TO PRIOR APPLICATIONS

The present invention is a Continuation-In-Part Application of, and claims priority to, U.S. patent application Ser. No. 10/685,214, filed Oct. 14, 2003, and now abandoned, by instant inventor which is a Continuation-In-Part Application of, and claims priority to, U.S. patent application Ser. No. 10/338,425 filed Jan. 8, 2003 by instant inventor, now U.S. Pat. No. 6,787,495, which in turn is a Divisional Application of, and claims priority to, U.S. patent application Ser. No. 09/602,067, filed on Jun. 22, 2000, now U.S. Pat. No. 6,533,821, issued on Mar. 18, 2003, and any other applications and/or patents in this line, all of which are hereby incorporated by reference in their entirety. The present non-provisional patent application also claims priority to U.S. Provisional Patent Application No. 60/510,898 filed on Oct. 14, 2003 by instant inventor, which is also hereby incorporated by reference in its entirety.

TECHNICAL FIELD

This invention relates to a high-insulation refractory composition and a method for making and applying the high-insulation refractory composition. More specifically, this invention relates to an aerated refractory composition to shield underlying substrates from thermal insult, and a method for making the aerated refractory composition.

BACKGROUND ART

Concrete, structural steel, and other structural members, left untreated, are susceptible to weakening in catastrophic events such as fire, explosions and attacks. Steel, for example, begins to lose its rigidity at approximately 1200° F. The most extraordinary example of this failure is the collapse of the World Trade towers on Sep. 11, 2001. During 9/11, the steel of the world trade towers was exposed to very high temperatures for a prolonged period of time.

Steel insulators, like those used in the World Trade Center, often delaminate during expansion which occurs in fires. Delamination also occurs in substrates having excess curvatures. Failure of insulators also occurs with prolonged exposure and excessive heat. Typical insulators include gypsum and Portland Cement. However, these substrates lose their binding properties above approximately 1400° F. Also, gypsum and Portland Cement provide no corrosion resistance to the underlying substrates.

A need exists in the art for an insulator to provide thermal protection to building structure members. The insulator must remain intact and provide protection to structural members in temperatures exceeding those found in petroleum-fed fires, electrical fires, and in those situations where a myriad of combustibles at the site are consumed to produce synergistic temperatures in excess of the ignition temperature of any one combustible. A need also exists for a method to produce a high-temperature resistant insulator, whereby the method uses standard ingredients, equipment, and typically trained formulators so as to provide a low-cost insulator.

DISCLOSURE OF INVENTION

The invention provides for an aerated refractory comprising a mixture containing a alkali or alkali metal phosphate, a metal oxide, a calcium containing compound; and an agent for increasing the volume of the mixture. In one preferred embodiment the calcium containing compound is selected from the group consisting of: hydroxyapatite, alpha and beta tricalcium phosphate, calcium silicate, and combinations thereof. The preferred metal phosphate is $KH_2PO_4$. The preferred metal oxide is MgO.

Also provided is a method for protecting a substrate with aerated refractory, the method comprising dry mixing a phosphate compound (i.e. $KH_2PO_4$) with a metal oxide and a calcium containing compound like tricalcium phosphate to produce a homogenous dry mixture; adding an aqueous solution like water to the mixture to produce a slurry; adding a foaming agent to the slurry; applying the slurry to the substrate; and allowing the slurry to dry. Alternatively the foaming agent can be incorporated into the dry mixture prior to addition of the aqueous solution.

An object of the present invention is to provide a novel heat and flame resistant refractory and a method for producing the refractory that overcomes many of the disadvantages of the prior art.

Another general object of the invention is to provide a formulation to cover construction materials and other substrates that are, or could be, exposed to heat and/or flame.

Another object of the present invention is to provide a formulation to cover structural members. A feature of the formulation is that it thermally insulates the structural members from heated fluids having temperatures as high as 2300° F. An advantage of the invention is that it provides a 700–800 degree increase in thermal protection compared to many state-of-the-art insulators.

Yet another object of the present invention is to provide a ceramic-based film which can be used to impart thermal and structural integrity to an underlying substrate. A feature of the film is it ability to impart structural rigidity to the substrate while also increasing the hourly rating of thermal integrity, compared to such typical film constituents as gypsum and Portland Cement. Another feature of the film is that it provides compressibility strength of approximately 9,000 psi (unaerated), compared to 3,500 for concrete and certain ceramic systems.

BEST MODE FOR CARRYING OUT THE INVENTION

The invented refractory and the method for producing the refractory confers enhanced mechanical characteristics to structural forms. Exemplary structural forms include steel, various ferrous and non-ferrous metals, gypsums, woods, composites of wood and cellulose, concrete, mortars, and synthetic products, including plastics, paper and carbon composites. The refractory confers a lightweight, fire-resistant outer coating to these underlying substrates, the coating exhibiting high bonding strength, high impact resistance, and high compressive strength.

A salient feature of the invented formulation is its aerated configuration. The aerated paradigm confers additional insulative characteristics to the unique formulation, while also conferring economic value to the bulk product.

Salient constituents of the refractory include potassium phosphate, metal oxides, such as magnesium oxide, and calcium containing compound like hydroxyapatite. More details are discussed in U.S. patent application Ser. No. 09/602,067, now U.S. Pat. No. 6,533,821 filed by instant inventor on Jun. 22, 2200, and incorporated herein by reference.

A salient addition to the formulary disclosed in the '067 application is an aerating agent. The aerating agent serves to enhance the volume of the refractory as the refractory cures in situ.

Exemplary formulations of the refractory binder include the following:

| Formulation I* (best mode) | |
|---|---|
| $KH_2PO_4$ | 45% |
| MgO | 45% |
| Calcium-containing compound | 7% (whereby the Ca containing compound is $CaSiO_3$, $Ca_{10}(PO_4)_6(OH)_2$, $Ca_3(PO_4)_2$ and/or combinations thereof) |
| Sodium bicarbonate | 3% |

*All values are weight percentages

Water is added up to 25 weight percent of the formulation, and preferably 22 to 25 weight percent.

| Formulation II* | |
|---|---|
| Potassium phosphate (technical grade-30 microns) | 63% |
| Magnesium oxide (technical grade) | 31% |
| alpha-Tricalcium Phosphate | 4% |
| Aerating Agent (ex: Sodium Bicarbonate) | 2% |

*All values are weight percentages

Water is added up to 25 weight percent of the formulation, and preferably 22 to 25 weight percent.

| Formulation III* | |
|---|---|
| Potassium phosphate (technical grade as above) | 61% |
| Magnesium oxide (technical grade-calcined) | 30% |
| Hydroxyapatite | 4% |
| $CaSiO_3$ | 4% |
| Aerating Agent (ex: Sodium Bicarbonate) | 1% |

*All values are weight percentages

Water is added up to 25 weight percent of the formulation, and preferably 22 to 25 weight percent.

| Formulation IV* | |
|---|---|
| $KH_2PO_4$ ("MKP") | 44% |
| Magnesium oxide | 44% |
| beta-Tricalcium phosphate | 10% |
| Aerating Agent (ex: Sodium Bicarbonate) | 2% |

*All values are weight percentages

Water is added up to 25 weight percent of the formulation, and preferably 22 to 25 weight percent.

| Formulation V* | |
|---|---|
| Potassium phosphate | 40% |
| Magnesium oxide | 40% |
| Tricalcium phosphate | 9% |
| Calcium silicate | 9% |
| Aerating Agent (ex: Sodium Bicarbonate) | 2% |

*All values are weight percentages

Water is added up to 25 weight percent of the formulation, and preferably 22 to 25 weight percent.

The exemplary formulations above may be combined with varying amounts of fillers. The variation of binder percentage depends on the desired consistency and use of the ultimate mixture.

While the above formulations and weight percents are the most preferred proportions, a range of dry constituents can also be used. For example, between 10–70 (preferably 30–65) weight percent of mono potassium phosphate and 5–60 weight percent metal oxide powder, (ex: MgO), (preferably 15–50). Calcium containing compounds can be added in various weight percentages. A preferred range being 0.5–50 weight percent, a more preferred range being 1–30 weight percent. The ranges for these components may vary with the addition of fillers and other supplementary materials.

A salient feature of the present invention is the ratio between MKP (or replacement) and the metal oxide. A preferred embodiment has a weight percent ratio between MKP and MgO between 4:1 and 0.5:1, more preferably between approximately 2:1 and 1:1. In such a preferred embodiment the inventor surmises that the un-reacted magnesium is at least partly responsible for the expandability characteristics of the refractory. Specifically the metal oxide (i.e. magnesium oxide) reacts with water to yield $Mg(OH)_2$ and magnesium salts. It has been found that the material generally expands during curing. The expansion of the material is believed to increase the adhesive characteristics of the material.

The weight ratio between MKP and MgO influences setting times, compressive strengths, and adhesive ability of the material. Materials having weight ratios (between MKP and MgO) above 4:1 tend to react to slow, have lower compressive strengths and possibly reduced expansion. Materials having weight ratio less than 0.5:1 (between MKP and MgO) have very short setting times and high setting temperatures.

MgO is the preferred metal oxide (or metal hydroxide), however, other oxide and hydroxide powders can be utilized in place of or in addition to MgO, including but not limited to FeO, $Al(OH)_3$, $Fe_2O_3$, $Fe_3O_4$, ZrO, and $Zr(OH)_4$.

MKP is preferred, but for some applications other compounds may be substituted for (or added to) MKP, including but not limited to: phosphoric acid and phosphoric acid salts like sodium and aluminum phosphate.

Calcium-Containing Compound

A calcium containing compound is essential to the invention as it creates a matrix with superior strength and flame/heat resistance. The calcium compound(s) can be selected from a variety of calcium containing compounds including but not limited to: alpha or beta tricalcium phosphate $Ca_3(PO_4)_2$, hydroxyapatite $Ca_{10}(PO_4)_6(OH)_2$, biphasic calcium phosphate, tetracalcium phosphate, amorphous calcium phosphate ("ACP"), $CaSiO_3$, oxyapatite ("OXA"), poorly crystalline apatite ("PCA"), octocalcium phosphate, dicalcium phosphate, dicalcium phosphate dihydrate, calcium metaphosphate, heptacalcium metaphosphate, calcium pyrophosphate and combinations thereof. Other calcium containing compounds are disclosed by U.S. Pat. No. 5,152,836 issued to Hirano, and U.S. Pat. No. 6,719,993 issued to Constanz all of which are herein incorporated by reference in their entirety.

Preferred calcium containing compounds include: hydroxyapatite, alpha and beta tri-calcium phosphate, biphasic calcium phosphate, $CaSiO_3$, ACP, dicalcium phosphate, dicalcium phosphate dihydrate and combinations thereof. Hydroxyapatite, tricalcium phosphates, $CaSiO_3$ and combinations thereof, being the most preferred.

Calcium containing compounds increase the flame and fire resistance of the material and are essential to the structure of the matrix.

Additional Embodiments

The formulations disclosed herein may incorporate additional fillers, additives and supplementary materials. The supplementary materials may be added in varying amounts and in a variety of physical forms, dependent upon the anticipated use. The supplementary materials can be used to alter the refractory in many ways. Exemplary additives include, but are not limited to, mullite, alumina, sand, clay, volcanic glasses, kyanite, bauxite, aluminum oxide, silicon oxide, chrome oxide, iron oxide, and mixture thereof. Supplementary materials and fillers are preferably non-toxic and fire and/or flame resistant.

Dry Powder Preparation

A metal oxide powder is a salient ingredient in the invented mixture. Optionally, the oxide is subjected to a calcinated process. Calcination durations and temperatures are determined empirically, depending on the final characteristics and setting times desired. Generally, however, calcination temperatures of up to 1300° C. for up to several hours are typical.

After calcination, the oxide powder is mixed with MKP (or replacement), a calcium containing compound, and any supplementary materials or additives until a homogeneous dry-phase compound results. One method for sizing and homogenizing the various powders is via vibratory milling. Another homogenization method utilizes a ribbon mixer wherein the particles are ground to a fineness of approximately 20–30 microns.

Slurry Preparation

Upon homogenization, wherein all of the constituents are contained in a dry homogenous mixture, water is added at proportion of 5–40 weight percent by weight to create a slurry. Preferably, water is present to make up to 25 weight percent of the slurry. The slurry is produced at the user site. The amount of water can be adjusted to form a material of varying viscosity. The slurry is generally mixed for between 1–20 minutes depending upon conditions. Mixing can be achieved by a variety of techniques used in the art including hand and electric mixing. See, U.S. Pat. No. 6,533,821 issued to present inventor for further details.

In one embodiment the invented bio-material contains a setting retarder or accelerant to regulate the setting time of the composition. Suitable retarders include but are not limited to sodium chloride, sodium fluosilicate, polyphosphate sodium, borate, boric acid, boric acid ester and combination thereof. Setting regulators are preferably added at less than 5 weight percent of the dry binder matrix.

Working times can be increased or decreased by varying the temperatures of materials components. Higher temperature components tend to react and set quicker than cooler components. Thus regulating the temperature of the water (or other reactants) can be an effective way to regulate working time.

Aerating Agent

The aerating agent can be added to the dry mixture before the addition of water or preferably, the aerating agent is added directly to the slurry after the addition of water (or other aqueous solution). Generally the aerating agent is present in an amount of 1–15 weight percent of the dry powder mix (i.e. MKP, MgO, calcium containing compound). The aerating agent increases the volume of the mixture and creates air pockets within the resulting refractory material. These characteristics increase the refractory's resistance to heat and flame resistance.

Exemplary aerating agents include carbonates and bicarbonates including but not limited to calcium carbonate, sodium carbonate, magnesium carbonate, potassium carbonate, sodium bicarbonate, calcium bicarbonate and combinations thereof. Other aerating agents like aluminum sulfate, mono-calcium phosphate, sodium aluminum sulfate, calcium sulfate, corn starch and combinations thereof can also be employed.

One preferred formula for the aerating agent is 25–75 weight percent of baking powder and/or baking soda with the remainder being light burned MgO.

The aerating agent can also be an approximately 50:50 weight mixture of calcined MgO and baking powder (i.e. baking soda, corn starch, sodium aluminum sulfate, calcium sulfate, monocalcium phosphate, or combinations thereof.) Generally, the aerating agent is present in a weight percent to the total slurry of between 1 and 20 percent.

The foaming (aerating) agent (containing the highly reactive MgO) is combined with the underlying refractory after the later is formed into a slurry. The binder slurry temperature is generally maintained in a temperature range of 40–100° F., preferably between 60–85° F. before the addition of a foaming agent. The MgO constituent of the foaming agent acts as a thickner and causes the slurry temperature to rise while freezing the foam slurry.

This results in a light weight foamed cement having open and closed cell formations.

The disclosed material may also be prepared with varying degrees of porosity using other means. Controlling porosity can be accomplished through a variety of means including: controlling the particle size of the dry reactants, and chemical and physical etching and leaching.

Generally, the slurry is applied to the substrate (i.e. structural beam) to be protected, either by putty knife, spraying, rolling, brushing, painting, trolling, dip-coating or other means.

The addition of a thickening agent may be necessary in spray applications. An exemplary agent is Cabo-sil present at 5 to 50 weight percent of the dry refractory mixture.

Best results are obtained with the ambient and substrate temperatures are between 60–75° F. Application amounts will vary but most suitable thicknesses of the refractory on the substrate will be such that slurry weights will range between 0.1 pounds per linear foot (12"×12"×1") to 80 pounds per linear foot. A preferable final application weight range is from 20–40 pounds per linear foot. A most preferable weight is approximately 35 pounds per linear foot.

While the invention has been described with reference to details of the illustrated embodiment, these details are not intended to limit the scope of the invention as defined in the appended claims. For example, the invented formulation can be instantly cured (i.e. hardened) by an outside heat source, such as but not limited to laser light. Without the application of heat, curing occurs usually within 30 minutes.

Also, aside from thermal insulation of steel structures, the invented aerated refractory substrate has a myriad of other uses including as a light weight cement with and without structural strength, as a constituent in refractory insulation panels, as a fireproof filler and as sound proofing substrates Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefor, is not intended to limit the claimed processes to any order except as may be specified in the claims. Accordingly, the invention is limited only by the following claims and equivalents thereto.

All publications and patent documents cited in this application are incorporated by reference in their entirety for all purposes to the same extent as if each individual publication or patent document were so individually denoted.

I claim the following:

1. An aerated refractory comprising:
    a. a mixture containing $KH_2PO_4$, a metal oxide, a calcium containing compound, an aqueous solution and;
    b. an aerating means for increasing the volume of the mixture.

2. The aerated refractory as recited in claim 1 wherein the calcium containing compound is selected from the group consisting of: $Ca_3(PO_4)_2$, $Ca_{10}(PO_4)_6(OH)_2$, $CaSiO_3$ and combinations thereof.

3. The aerated refractory as recited in claim 1 wherein the calcium containing compound is $Ca_{10}(PO_4)_6(OH)_2$.

4. The aerated refractory as recited in claim 1 wherein the aerating means is an aerating agent.

5. The aerated refractory as recited in claim 4 wherein the aerating agent is selected from the group consisting of sodium carbonate, calcium carbonate, magnesium carbonate, potassium carbonate, sodium bicarbonate, calcium bicarbonate, aluminum sulfate, mono-calcium phosphate, sodium aluminum sulfate, calcium sulfate, corn starch, baking powder and mixtures thereof.

6. The aerated refractory as recited in claim 4 wherein the aerating agent is sodium bicarbonate.

7. The aerated refractory as recited in claim 1 wherein the weight percent ratio between $KH_2PO_4$ and the metal oxide is between approximately 3:1 and 1:2.

8. The aerated refractory as recited in claim 1 wherein the metal oxide is selected from the group consisting of MgO, FeO, $Fe_2O_3$ and ZrO.

9. The aerated refractory as recited in claim 1 wherein the metal oxide is MgO.

10. The aerated refractory as recited in claim 1 wherein the aqueous solution is water.

11. A method for protecting a substrate with aerated refractory, the method comprising:
    (a) dry mixing $KH_2PO_4$ with a metal oxide and a calcium containing compound to produce a homogeneous dry mixture;
    (b) adding an aqueous solution to the mixture and mixing to create a slurry;
    (c) adding an aerating agent to the slurry and mixing creating an aerated slurry;
    (d) applying the aerated slurry to the substrate; and
    (e) allowing the aerated slurry to dry.

12. The method as recited in claim 11 wherein the slurry is maintained at between 60 and 85° F. prior to its application to the substrate.

13. The method as recited in claim 11 wherein the substrate is maintained at between 50 and 75° F.

14. The method as recited in claim 11 wherein the aerating agent is added to the slurry in a weight percent of between 1 and 20.

15. The method as recited in claim 11 wherein the metal oxide is MgO.

16. The method as recited in claim 11 wherein the calcium containing compound is selected from the group consisting of: $Ca_3(PO_4)_2$, $Ca_{10}(PO_4)_6(OH)_2$, $CaSiO_3$ and combinations thereof.

17. The method are recited in claim 11 wherein the aerating agent is selected from the group consisting of: sodium carbonate, calcium carbonate, magnesium carbonate, potassium carbonate, sodium bicarbonate, calcium bicarbonate, aluminum sulfate, mono-calcium phosphate, sodium aluminum sulfate, calcium sulfate, corn starch, baking powder and mixtures thereof.

* * * * *